United States Patent [19]

Bussiere et al.

[11] Patent Number: 4,851,237

[45] Date of Patent: * Jul. 25, 1989

[54] PROCESS FOR MANUFACTURING CHEESES FROM MILK POWDER BY COLD RENNETING

[75] Inventors: Guy Bussiere, Ramonville; Jean Lablee, Mamirolle, both of France

[73] Assignee: Roquette Freres, Lestrem, France

[*] Notice: The portion of the term of this patent subsequent to Jul. 25, 2006 has been disclaimed.

[21] Appl. No.: 942,680

[22] Filed: Dec. 17, 1986

[30] Foreign Application Priority Data

Dec. 17, 1985 [FR] France .................... 85 18689

[51] Int. Cl.⁴ .................... A23C 19/05; A23C 19/068
[52] U.S. Cl. ............................ 426/39; 426/40; 426/582
[58] Field of Search .................. 426/34, 36, 37, 38, 426/39, 40, 42, 43, 61, 580, 582, 491, 657

[56] References Cited

U.S. PATENT DOCUMENTS

| | | |
|---|---|---|
| 2,982,654 | 5/1961 | Hammond et al. |
| 3,406,076 | 10/1968 | Little |
| 4,020,186 | 4/1977 | Edwards ............... 426/36 |

FOREIGN PATENT DOCUMENTS 229471 1/1981 European Pat. Off.
1096174 12/1967 United Kingdom.

OTHER PUBLICATIONS

Jean Lablee, Bulletin International Dairy Federation 116: 36–38 (1979).
Jean Lablee, Bulletin International Dairy Federation 142: 119–125 (1982).
D. D. Deane et al, "Coagulation of Milk for Cheese Making by Ester Hydrolysis" Journal of Dairy Science 43/10: 1421–1429 (Oct. 1960).

*Primary Examiner*—Marianne Cintins
*Attorney, Agent, or Firm*—Fleit, Jacobson, Cohn, Price, Holman & Stern

[57] ABSTRACT

In the process of the invention for manufacturing cheeses from milk powder, by cold renneting, in the course of the phase of preparation of the milk before renneting, an acidogen selected from the group consisting of gluconolactones and glucoheptonolactones is added to the rehydrated milk in an amount sufficient to attain simply and reliably, in a predetermined time, the exact predetermined renneting pH having a value of 5.0 to 6.6. The acidogen is advantageously gluconodeltalactone. The process is applied in the manufacture of cheeses from milk powder, by cold renneting, with mastery of the acidification phase of the milk.

19 Claims, No Drawings

PROCESS FOR MANUFACTURING CHEESES FROM MILK POWDER BY COLD RENNETING

The invention relates to the manufacture of cheeses from milk powder, by cold renneting.

More precisely, the invention relates to a process for manufacturing cheeses from milk powder, by cold renneting, characterized in that the acidification of the milk is carried out in a controlled manner by means of an acidogen.

To take into account problems connected with the difficulties of storage and shipment of the milk, it has already been proposed to use milk powder, preferably skimmed to manufacture cheeses of different types, particularly by cold renneting.

Numerous articles have been published on this subject; one can cite in this respect the articles of Jean LABLEE, Director of the E.N.I.L. of Mamirolle (Doubs, France) et al. in Bulletin International Dairy Federation, vol. 116, pages 36-38 (1979) and vol. 142, pages 119-125 (1982), in "Revue des ENIL", No. 2, pages 13-14 (1975), No. 37, pages 12-15 (1978), No. 60, pages 29-33 (1981), in "La Technique Laitière", vol. 23 (790), pages 17-18 and in "La Revue Laitière Française", No. 279, pages 599-600 (1970) and No. 373, pages 17-20 (1979).

Taking into account particularly information appearing in these articles, it is observed that practically all types of cheeses can be manufactured from milk powder.

The invention relates therefore in practice to all types of cheeses, namely among others the various types of cheeses mentioned in the work "Le fromage", coordinated by André Eck, "Technique et Documentation" (Lavoisier), Paris (1984), particularly pages 220 to 223, as well as cheeses for melting.

In general, the manufacture of these various cheeses from milk powder comprises the conventional steps well known to the man skilled in the art, of cheese manufacture from "fresh milk" with as the case may require some modifications of practice. It necessitates however an additional step connected with the rehydration of the milk powder, as has already been mentioned particularly in the various articles mentioned above.

It is recalled that this step consists either of a "reconstitution" or of a "recombination" of the milk phase.

By "reconstitution" is meant the simple dispersion in water of milk powder containing or not containing the natural fats of the milk.

By "recombination" is meant all of the operations necessary for obtaining a fatty milk from skimmed milk powder and fats, anhydrous or not, particularly of dairy origin.

Thus the manufacture of cheeses from skimmed milk powder whose preservation is particularly good in comparison to whole milk powder, comprises generally a prior step of reconstitution and/or of recombination of the milk.

Traditionally when milk powder is used for the manufacture of cheeses according to cold renneting processes, the "reconstituted" or "recombined" milk used is concentrated more or less with respect to "normal" milk. For simplification, in the following, this milk will be called "concentrated milk".

From this concentrated milk, all the steps relating to the manufacture of cheeses, namely: maturation, renneting, coagulation, etc., are carried out.

A particularly advantageous process called "Simplified Instantaneous Coagulation" (S.I.C.) for the manufacture of cheeses by cold renneting has been developed by the Ecole Nationale de l'Industrie Laitière (E.N.I.L.) and by the G.I.E./I.T.I.L. de Mamirolle-Besancon (France). It is described particularly in "Revue Laitière Française", No. 445, pages 56-57 (October 1985).

In this process, the procedures relating to the phases of reconstitution and recombination of the milk are established so that the resulting milk has a concentration equal to or greater than twice that of ordinary milk, namely a minimum value of non fat dry extract or matter of 180°/..., the proportion of fat depending on the type of cheese manufactured; generally this concentration is double that of ordinary milk.

Traditionally, the concentrated milk is matured by inoculation with lactic ferments whose type and dose are selected according to the nature of the cheese envisaged. At this stage, the seeded milk is kept at a temperature favourable to fermenting activity, for example, close to 35° C.

In the case of cold renneting processes, such as particularly the S.I.C. process, the matured concentrated milk is cooled rapidly to a temperature comprised between 4° and 10° C. and this as soon as it has reached the required pH for renneting, generally comprised between 6.0 and 6.6. The coagulating enzymes are added at this moment. The renneted milk is kept cold for 2 to 24 hours, according to the degree of cooling, without any starting of coagulation. After this lapse of time, coagulation of the so prepared renneted milk follows.

The coagulation is then achieved instantaneously by intimate mixing with hot water, of the renneted concentrated cold milk in proportions which depend on the temperature of the water, the milk used and the "concentration" of the latter, the principal aim being the obtaining of an optimum range of temperatures to promote coagulation.

The temperature of this water is more precisely defined so as to obtain after mixing with the cold milk a coagulation temperature of 37° to 50° C., this temperature conditioning the characteristics of the curd.

Ten to fifteen minutes after this coagulation phase, the curd is separated from the whey, moulded, formed and ripened by the customary methods suitable for each type of cheese.

In the particular case of cheeses obtained from milk powder of ordinary quality, intended for melting, procedure is preferably towards producing a skim-milk cheese, which is expressed by the fact that the fatty substance is only introduced at the melting stage. In this case, and particularly on use as raw material of a very young cheese free from fat, the pH's of coagulation and of the end of draining must be scrupulously respected to obtain a melting without non-melting particles, otherwise it is imperative to modify the draining and to prolong the period of ripening of the cheese.

As a matter of fact, in processes using milk powder, to the drawbacks already known common to all processes of manufacturing cheeses from "fresh milk", become added those inherent in the use of milk powder. Thus, for example, the operation of dehydration, generally carried out thermally by concentration then spraying, results in the modification of the casein micella, which is expressed in practice by a reduction in the fitness for the transformation of the milk into cheese.

The S.I.C. process represents certain progress with respect to the other processes of preparing cheeses, particularly to the extent that it permits good quality curd to be obtained very simply, from a commercial product of good preservation and easy to ship, namely milk powder, generally skimmed. However, it still has certain drawbacks.

Thus, even in cold renneting processes like the S.I.C. process, when the maturation of the milk is carried out by means of lactic ferments, it is very difficult, even impossible, to control and stabilize the aboveindicated pH's by reason of the almost exponential growth phase of the lactic flora in the course of time and of the practical impossibility of stopping its action, especially for pH values less than 6.2.

In addition, considerable expense results from the fact that to promote the activity of the lactic ferments in the course of the maturation phase, it is necessary to bring the milk to a temperature in the vicinity of 35° C. and to then cool it to 6° C. to add the coagulating enzymes.

Finally, when cold renneting processes are used to manufacture cheeses intented for melting, the presence of a considerable amount of non-melting particles is frequently observed in the cheese obtained, by reason of the difficulty of carrying out a strict control of the pH's of the renneting, coagulation and taking from the mould steps.

There is therefore an interest which is certain in the development of a novel process for manufacturing cheeses by cold renneting from milk powder making it possible to eliminate the above-described drawbacks.

Thus Applicants have developed a novel process for manufacturing cheeses, from milk powder, by cold renneting enabling perfect mastery of the kinetics of acidification of the milk and stabilization of the pH's at the various steps of manufacture of the cheeses from milk powder.

This novel process is characterized by the fact that acidification of the rehydrated milk is carried out into a controlled manner up to a pH value of 5.0 to 6.6 by means of an acidogen.

By "milk powder" is meant, according to the invention, all types of milk powders, like for example, powders obtained from whole milk, from skimmed milk or from partly skimmed milk from all sources, and this whatever the means employed for drying it. However, according to the invention, advantageously a skimmed milk powder of the quality known under the name "medium" or "high heat" is used; milk powders of this type constitute the essential part of the milk powders available on the international market.

By acidogen is meant here all substances capable, after solubilization in an aqueous medium, of being converted progressively into an acid.

Among the substances of this type, appear certain acid anhydrides, lactids and particularly those with a low melting point of lactic acid, lactones such as gluconolactones and glucoheptonolactones, and similar substances and/or their mixtures.

These definitions being given, the invention relates to a process for manufacturing cheeses by cold renneting from milk powder, this process comprising essentially the steps of rehydration of the milk, acidification, cold renneting, coagulation and as the case may require additional steps of grinding, moulding, pressing, taking from the mould and/or ripening, characterized by the fact that the acidification of the rehydrated milk is carried out in a controlled manner to a pH value of 5.0 to 6.6, by means of an acidogen.

It is well known that the kinetics of conversion of an acidogen into an acid is strictly dependent on the temperature of the aqueous medium in which it is solubilized. Consequently, from the three basic parameters of the milk used according to the invention, which are:

the pH of the milk after its rehydration,
the pH required for renneting,
the temperature of the milk up to renneting (generally comprised between 4° and 10° C.), the technician can determine with accuracy the dose of acidogen to be incorporated and the time required to reach the desired renneting pH, knowing with certainty the hydrolysis kinetics of the acidogen.

This improvement brought about by the addition of acidogen at the time of maturation leads therefore to a perfect and total mastery of the preparation phase of the milk.

In the more particular case of cheeses to be melted, it has been observed that, surprisingly, due to the use of an acidogen in the course of the acidification step, it is possible to melt the cheese without ripening, without however non-melting particles appearing.

Generally, the addition of an acidogen can be done indifferently in powder form or in solution form.

In the case where the acidogen is added in pulverulent form, its dispersion in the powdered or rehydrated milk and its subsequent solubilization are ensured by any suitable stirring means.

In the case where it is preferred to add the acidogen in the form of a solution, the latter may be prepared preferably at the time of use, in order to limit as much as can be the hydrolysis of the acidogen. In fact if, through this hydrolysis, the acidogen solution had too great an acidity, the well-known drawbacks connected with the direct use of acids in the industrial production of cheeses will again appear.

In practice, and taking into account the particularities peculiar to each cheese manufacturing line, the technician, knowing the hydrolysis kinetics of the acidogen employed, will determine the best moment to introduce it and the best manner of doing it.

Finally, besides the technical advantages associated with the complete mastery of the acidification kinetics of the milk and of the stabilization of the pH's at the various stages of the manufacture of cheeses from milk powder, Applicants have also established that the replacement of the lactic ferments by an acidogen, at the acidification phase, was without significant incidence on the characteristics of texture and taste of the cheeses obtained.

The invention does not imply however for all that the total elimination of lactic ferments. It is in fact possible to introduce some, in the course of the use of this process, in a suitable amount which is a function of the desired characteristics such as, for example, particular organoleptic characters.

Thus, lactic ferments could be introduced in the course of the acidification phase of the milk preceding renneting, but it would then be necessary for their amount to be sufficiently low not to influence significantly the kinetics of reduction of the pH, in order not to reencounter the drawbacks of the prior art. On the other hand, the amount of lactic ferments could be greater if they are added at the time of renneting.

In any event, generally, by the invention significant modifications of the organoleptic characters of the cheeses obtained are not observed. In the case of processed cheeses (i.e. "melted cheeses"), the invention enables the pH of renneting to be lowered to a value in the vicinity of 5.75, which is parctically impossible with lactic ferments used alone, and this results in a particularly noticeable improvement in the organoleptic qualities of these cheeses.

The acidogens used according to the invention are preferably the gluconolactones and the glucoheptonolactones, more preferably the gluconolactones and particularly the gluconodeltalactone (GDL).

In the precise case of the cheese-making industry, besides the aforesaid advantages, the excellent solubility in aqueous media of GDL and its hydrolysis kinetics at the temperatures customarily encountered render it perfectly adapted to the particular requirements in the manufacture of cheeses from milk powder.

In the cold renneting processes, such as the S.I.C. process, the high solubility of GDL enables operation at ambiant temperature, even at a lower temperature, that is to say at a temperature closer to the renneting temperature (generally 6° C.) than according to the prior art, the limiting factor being the aptitude of the milk powder to solubilization at low temperature.

Advantageously, the amount of acidogen employed according to the invention is from 0.05 to 500 g/kg of milk powder. Preferably, it is comprised between 0.1 and 200 g/kg of milk powder, and more preferably between 0.2 and 100 g/kg of milk powder, according to the acidogen used.

Thus, in the particular case where the acidogen is GDL, the amount employed is advantageously 0.1 to 200 g/kg of milk powder, preferably 0.5 to 80 g/kg of milk powder and, more preferably, from 1 to 60 g/kg of milk powder.

According to an advantageous embodiment, the invention is employed within the framework of an S.I.C. process.

More precisely, according to this advantageous embodiment, the invention relates to a cheese manufacturing process by cold renneting from milk powder, this process comprising essentially the steps of rehydration of the milk, acidification, cold renneting, coagulation and as the case may require additional steps of grinding, moulding, pressing, taking from the mould and/or ripening, characterized in that:
- the rehydration of the milk is carried out so that resulting milk has a concentration higher than that of ordinary milk, preferably at least equal to the double;
- the acidification of the thus rehydrated milk is done in a controlled manner to a pH value of 5.0 to 6.6 by means of an acidogen;
- the renneting is done after cooling the milk to 6°–10° C.; and
- the renneted concentrated milk is mixed with water at a temperature such, and in proportion such, that the temperature of the mixture obtained is from 37° to 50° C., according to the type of cheese, to cause instantaneous coagulation.

The invention will be better understood by means of the examples which follow and which comprise the description of advantageous embodiments. All these examples have been carried out by I.T.I.L. at the premises of the Ecole Nationale d'Industrie Laitière de Mamirolle-Besançon (France).

EXAMPLE 1- Control

Manufacture of a no fat cheese from reconstituted skim milk, for melting.

In a basin of 100 l, a skim milk of double the concentration of the normal is reconstituted, namely a content of defatted dry extract (D.D.E.) content of 18% by a solubilization for about 10 minutes, by means of a mixer of type MX79 (Dynamic Company-06140 Vence), 9.375 kg of skim-milk powder and 40.625 kg of drinking water at the temperature of 35° C. 47 l of doubly concentrated milk is obtained, which is subjected to maturation in a tank of 80 l with a double jacket, by the addition of two types of lactic ferments:

mesophilic lactic ferments employed under the following conditions: a concentrated and frozen preparation marketed by Miles Laboratories-Division Marshall (rue des Longs Réages-28230 Epernon, France), is cultivated on Marstar nutrient medium, marketed by the same Laboratories, applying strictly the conditions of preparation recommended by said Laboratories. 1.2% of this culture (expressed by volume with respect to the milk) are then mixed with the concentrated milk.

thermophilic lactic ferments constituted by a mixture of a lyophilized preparation of thermophilic streptococci coming from Boll-Hansen Laboratories (49 rue de la Bienfaisance-94300 Vincennes, France) and a lyophilized preparation of Lactobacillus helveticus and lactis coming from the Lacto-Labo Company (BP 10-23 rue du Collége-86220 Dange-Saint-Romain, France), cultivated on skim-milk sterilized in the autoclave under conditions selected so that after the incubation, the culture contains approximately 50% of streptococci and 50% of Lactobacillus (evaluation done by microscopic examination). 1.2% (by volume with respect to the milk) of this culture are mixed with the milk.

When the temperature of the milk is in the vicinity of 10° C., 37.5 g of monocalcium phosphate previously solubilized in about 0.9 l water at ambiant temperature are added and it is mixed for about 5 minutes.

After a variable time, comprised between ½ hour and 1 hour, the milk reaches the pH of 6.20±0.02. The activity of the lactic ferments is then moderated by cooling the milk to 6° C., which is done in about 30 minutes by a flow of water cooled to 3°-4° C. in the double jacket, after which the milk is withdrawn into a basin which is placed in a refrigerated place at 6° C. The milk is then renneted by the addition of coagulating enzymes in the form of 15 ml of a commercial coagulating enzyme preparation containing about 520 mg of chymosin per liter.

The doubly concentrated milk is left at 6° C. overnight, namely a period of about 10 hours. The coagulation is then done as follows: into a basin of capacity 100 l is introduced about 47 liters of hot water at the specified temperature of 84° C. The contents of the basin of concentrated milk at 6° C. is poured by instantaneous complete tipping into the hot water. A moderate stirring with a wooden spoon enables the agglomeration of the curd to be avoided. The temperature is 45° C. The curd is formed very rapidly. 10 to 15 minutes later, the moulding of the curd is carried out in five perforated metal moulds (diameter 27 cm, height 24 cm) provided internally with filter cloths (gruyère cloth type), after separation of the whey by means of a pump provided with a strainer.

A slight pressing produced by a load providing a pressure of about 500 Pa (5 g/cm$^2$) is maintained for some hours and enables the desired cohesion and dry extract to be obtained. The cheese is then taken from the mould. The pH is then 5.15±0.02.

EXAMPLE 2- according to the invention

Manufacture of a no fat cheese from reconstituted skim milk, for melting.

It is strictly identical with example 1, except that:
the water serving for rehydrating the milk powder is at the temperature of 15° C. instead of 35° C., whence easier cooling to 6° C.,
the lactic ferments are eliminated,
after cooling to 6° C. in 10 minutes approximately and before renneting, 500 g of crystalline gluconodeltalactone (GDL) marketed by the Roquette Freres Company are introduced and solubilized by mechanical stirring.

With these modifications, after the 10 hours of maintenance at 6° C., the pH is precisely at the desired value, namely 5.75±0.02. On taking from the mould, the pH is exactly at the desired value, namely 5.40±0.02, that is to say the pH considered as an optimum for a correct melting.

The cheeses obtained, both in example 1 and in example 2 are subjected to melting in the hours following the taking from the mould, by a formulation and a procedure which are conventional for this type of cheese. Examination of the hot molten mass at the end of this melting phase shows a perfect homogeneity in the case of example 2, while translucent particles are visible in the case of example 1.

Moreover, the choice of the melting salt varying according to the pH of the cheese used for the melting, a delicate research for the salt judged the best is necessary in the case of manufactures with lactic ferments, whereas this is easier in the case of the manufacture according to the invention, taking into account the constancy of the pH of the cheese used for the melting.

It is to be noted that, in example 2 according to the invention, the pH only changes slightly between the end of the cold renneting and the end of the manufacture since it only passes from 5.75 to 5.40. This is not the same in example 1 according to the prior art since the lactic ferments continue their action during this lapse of time, which explains why the aim is a pH of 6.20 at the end of cold renneting for the purpose of arriving at a pH as close as possible to 5.40 at the end of manufacturing which is in fact 5.15.

EXAMPLE 3- Control

Manufacture of a cheese with about 45% of fat (expressed on dry material) and about 45% of total dry extract ("queso blanco" type).

From 6 kg of skim-milk powder of ordinary quality, 32.0 kg of skim-milk of double the normal concentration are reconstituted, namely a content of defatted dry extract of 18%, by mixing with it 26.0 kg of drinking water at 35° C., by means of the same mixer and in the same basin as in example 1.

A fraction of 4.5 kg is taken from the 32.0 kg of reconstituted skim-milk which is reheated on the water bath to 60° C. 1.92 kg of anhydrous milk fat is melted in the water bath to a temperature of 60° C. The two fractions are blended and mixed for a period of 6 to 10 minutes with the same mixer as above. In this way 6.42 kg of "cream" with 30% of fat is obtained, at a temperature of about 55° C., taking into account the unavoidable cooling.

The 27.5 kg of skim milk remaining, at 30° C., are mixed with the 6.42 kg of "cream" at 55° C., which enables, after stirring, with the wooden spoon, 33.9 kg of concentrated whole milk at a temperature of 35° C. to be obtained with the following characteristics:

| T.D.E. | (total dry extract) | 23.4% |
|---|---|---|
| F. | (fat) | 5.7% |
| D.D.E | | 17.7% |
| pH | | 6.38 ± 0.02 |

This doubly concentrated milk is subjected to maturation by the addition of two types of lactic ferments:

Mesophilic lactic ferments employed under the following conditions: a concentrated and frozen preparation marketed by Miles Laboratories-Division Marshall (rue des Longs Réages-28230 Epernon, France), is cultivated on Marstar nutrient medium, marketed by the same Laboratories, applying strictly the conditions of preparation recommended by said Laboratories. 1.2% of this culture (expressed by volume with respect to the milk) are then mixed with the milk.

Thermophilic lactic ferments constituted by a mixture of a freeze-dried preparation of thermophilic streptococci (same nature and same source as in example 1) and a freeze-dried preparation of Lactobacillus helveticus and lactis coming from the Lacto-Labo Company (BP 10-23 rue du Collège-86220 Dange-Saint-Romain, France), cultivated on skim-milk sterilized in the autoclave under conditions selected such that after incubation, the culture contains approximately 50% of streptococci and 50% of Lactobacillus (evaluation done by microscopic examination). 1.2% by volume of this culture are mixed with the milk.

When the temperature of the milk is close to 10° C., 48 g of monocalcium phosphate previously solubilized in about 0.5 l water at ambiant temperature are added and it is mixed for about 5 minutes.

After a variable time, comprised between ½ hour and 1 hour, the milk reaches the pH of 6.25±0.02. The activity of the lactic ferments is then moderated by cooling the milk to 6° C., which is done in about 30 minutes by a flow of water cooled to 3°-4° C. in the double jacket, after which the basin is put in a place cooled to 6° C. The milk is then renneted by the addition of coagulating enzymes in the form of 10 ml of a commercial preparation of coagulating enzymes containing 520 mg of chymosin per liter.

The doubly concentrated milk is left at 6° C. overnight, namely a period of about 10 hours. The coagulation is then done as follows: in a tank of capacity about 100 l, a quantity of 33.9 kg of drinking water which is heated to 84° C. to which 4% of salt (sodium chloride) is added, is prepared.

The contents of the basin of concentrated milk at 6° C. is poured by instantaneous complete tipping into the hot water. Moderate stirring for 15 seconds approximately with a wooden spoon enables agglomeration of the curd to be avoided. Temperature is 45° C. The curd is formed very rapidly. 10 to 15 minutes later, the moulding is carried out. The curd is distributed into three moulds of perforated plastic material (height 12.5 cm, width 12 cm, length 25 cm) provided internally with a cloth of the type for pressed Galantine placed, after separation of the whey by means of a pump provided with a strainer.

A slight pressing carried out by means of a load producing a pressure of about 500 Pa (5 g/cm$^2$) is maintained for some hours and enables the desired cohesion and dry extract to be obtained. The cheeses are then taken out of the mould.

In this way, cheeses of the "queso blanco" type fit for immediate consumption are obtained.

EXAMPLE 4- according to the invention

Manufacture of a cheese with 45% of fat (expressed on dry matter) and about 45% of total dry extract ("Queso blanco" type).

This example is strictly identical with example 3, except that:
the lactic ferments are eliminated,
after cooling to 6° C. in about 10 minutes before renneting, 235 g of crystalline gluconodeltalactone (GDL) marketed by the Roquette Freres Company are introduced and solubilized by mechanical stirring.

With these modifications, after the 10 hours of maintenance at 6° C., the pH is precisely at the desired value, namely 6.0. Upon taking out of the mould, the pH is exactly at the desired value, namely 5.2.

In this way, a "queso blanco" type cheese is obtained which, on tasting, reveals itself to be very similar to the cheese of example 3.

EXAMPLE 5- Control

Manufacture of a semi-cooked pressed cheese.

A cheese identical with that of example 3 is made, and then the fresh cheese obtained is subjected to a "dry crust" ripening, that is to say without any surface treatment during the whole of the ripening, the cheese being placed on a board in a room of hygrometry between 75 and 80%. After 2 months, a cheese with about 53% of total dry extract is obtained, very similar to the semi-cooked pressed cheese called Gouda.

EXAMPLE 6- according to the invention

Manufacture of a semi-cooked pressed cheese.

A cheese identical with that of example 4 is made and it is subjected to the same ripening as in example 5.

In this way, a ripened cheese having organoleptic characteristics very close to those of the cheese of example 5 is obtained.

EXAMPLE 7- Control

Manufacture of a cheese of the soft type (camembert type).

A cheese identical with that of example 3 is made except that:
at the moment on which the lactic ferments are added, there are also added spores of Penicillium camemberti and Geotrichum candidum mould fungi in the proportion of 100 million spores of each of them,
the moulds are perforated moulds of plastic material called baskets (height: 9 cm, lower diameter : 8 cm, upper diameter: 10 cm).

The fresh cheeses obtained after taking out of the mould have a pH of 5.20. They then undergo ripening under the usual well-known conditions of soft cheese manufacture.

EXAMPLE 8- according to the invention

Manufacture of a cheese of soft cheese type (camembert type).

A cheese identical with that of example 4 is made except that it is seeded with mould fungi and the moulds are different, these two modifications being identical with those applied in example 7.

We claim:

1. A process for manufacturing cheese from milk powder by cold renneting, wherein rehydrated milk is obtained by rehydration of a milk powder and the rehydrated milk is acidified in a reproducible and reliable manner for renneting, comprising the steps of:
    rehydrating a milk powder to obtain rehydrated milk;
    providing a given volume of said rehydrated milk from which the cheese is to be prepared;
    measuring the initial pH and temperature of the rehydrated milk;
    selecting a period of time within which the pH of the rehydrated milk will be brought from the initial pH to a renneting pH, said renneting pH being between 5.0 and 6.6 and said renneting pH being the required renneting pH for the type of cheese being manufactured;
    acidifying the rehydrated milk for renneting solely by adding an acidogen to the rehydrated milk, said acidogen being selected from the group consisting of gluconolactones and glucoheptonolactones and said acidogen being added to the rehydrated milk in an amount which is the minimum amount required to bring the initial pH of the rehydrated milk to the renneting pH within the selected period of time, said minimum amount of acidogen being determined based on the kinetics of transformation of the acidogen at said temperature of the rehydrated milk and as a function of the volume of the rehydrated milk and the selected period of time, whereby the rehydrated milk is acidified for renneting and brought from the initial pH to the renneting pH solely by the acidogen;
    renneting the rehydrated milk thus acidified at a temperature between about 4° C. and about 10° C. by adding coagulating enzymes to the acidified rehydrated milk, and then coagulating.

2. A process of claim 1, further comprising the step of adding lactic ferments to the rehydrated milk prior to renneting, said lactic ferments being added for organoleptic and textural purposes only and being added at a time and in an amount such that the lactic ferments do not influence acidification for obtaining the renneting pH of the rehydrated milk by the acidogen.

3. A process according to claim 1, wherein the amount of acidogen employed is from 0.05 to 500 g/kg of milk powder.

4. A process according to claim 3, wherein the amount of acidogen employed is between 0.1 and 200 g/kg of milk powder.

5. A process according to claim 4, wherein the amount of acidogen employed is between 0.2 and 100 g/kg of milk powder.

6. A process according to claim 1, wherein the acidogen employed is gluconodeltalactone (GDL).

7. A process according to claim 6, wherein the amount of GDL employed is 0.1 to 200 g/kg of milk powder.

8. A process according to claim 7, wherein the amount of GDL employed is between 0.5 and 80 g/kg of milk powder.

9. A process according to claim 8, wherein the amount of GDL employed is between 1 and 60 g/kg of milk powder.

10. A process for manufacturing cheese from milk powder by cold renneting, wherein rehydrated milk is obtained by rehydration of a milk powder, the rehydrated milk having a concentration of dry extract higher than that of fresh milk, and wherein the rehydrated milk is acidified in a reproducible and reliable manner for renneting, comprising the steps of:

rehydrating a milk powder to obtain rehydrated milk having a concentration of dry extract higher than fresh milk;

providing a given volume of said rehydrated milk from which the cheese is to be prepared;

measuring the initial pH and temperature of the rehydrated milk;

selecting a period of time within which the pH of the rehydrated milk will be brought from the initial pH to a renneting pH, said renneting pH being between 5.0 and 6.6 and said renneting pH being the required renneting pH for the type of cheese being manufactured;

acidifying the rehydrated milk for renneting solely by adding an acidogen to the rehydrated milk, said acidogen being selected from the group consisting of gluconolactones and glucoheptonolactones and said acidogen being added to the rehydrated milk in an amount which is the minimum amount required to bring the initial pH of the rehydrated milk to the renneting pH within the selected period of time, said minimum amount of acidogen being determined based on the kinetics of transformation of the acidogen at said temperature of the rehydrated milk and as a function of the volume of the rehydrated milk and the selected period of time, whereby the rehydrated milk is acidified for renneting and brought from the initial pH to the renneting pH solely by the acidogen;

renneting the rehydrated milk thus acidified at a temperature of 6° to 10° C. by adding coagulating enzymes to the acidified rehydrated milk to obtain renneted milk; and then mixing with water the renneted milk having a concentration of dry extract higher than that of fresh milk, the temperature and the proportion of the water being selected so that the temperature of the resultant mixture of renneted milk and water is at a value from 37° to 50° C., the value being selected according to the type of cheese being manufactured, whereby instantaneous coagulation is caused.

11. A process of claim 10, further comprising the step of adding lactic ferments to the rehydrated milk prior to renneting, said lactic ferments being added for organoleptic and textural purposes only and being added at a time and in an amount such that the lactic ferments do not influence acidification for obtaining the renneting pH of the rehydrated milk by the acidogen.

12. A process according to claim 10, wherein the concentration of the rehydrated milk is at least equal to twice that of "fresh milk".

13. A process according to claim 10, wherein the amount of acidogen employed is from 0.05 to 500 g/kg of milk powder.

14. A process according to claim 13, wherein the amount of acidogen employed is between 0.1 and 200 g/kg of milk powder.

15. A process according to claim 14, wherein the amount of acidogen employed is between 0.2 and 100 g/kg of milk powder.

16. A process according to claim 10, wherein the acidogen employed is gluconodeltalactone (GDL).

17. A process according to claim 16, wherein the amount of GDL employed is 0.1 to 200 g/kg of milk powder.

18. A process according to claim 17, wherein the amount of GDL employed is between 0.5 and 80 g/kg of milk powder.

19. A process according to claim 18, wherein the amount of GDL employed is between 1 and 60 g/kg of milk powder.

* * * * *